D. A. CLARK AND C. E. LOWE.
METHOD OF MAKING TIRE MANDRELS.
APPLICATION FILED JULY 31, 1919.
1,380,528.
Patented June 7, 1921.
2 SHEETS—SHEET 1.
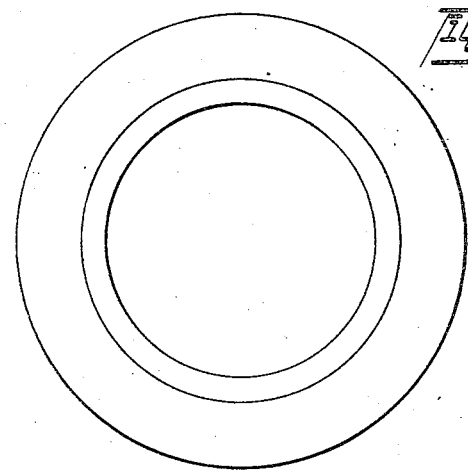
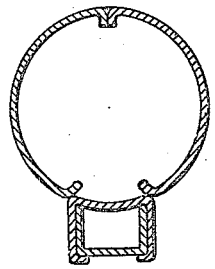
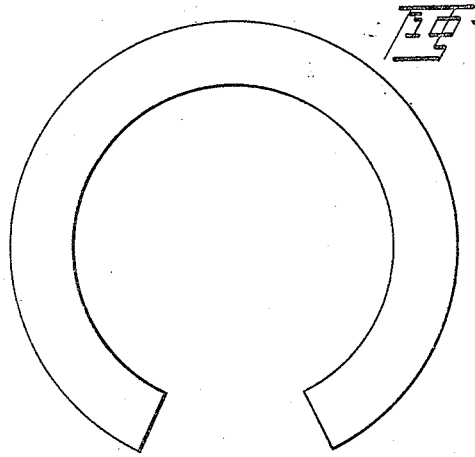
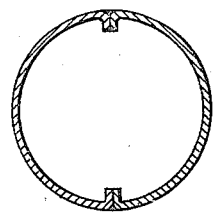
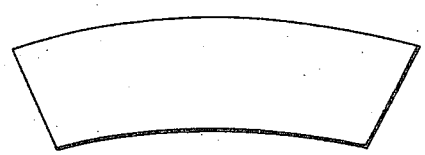
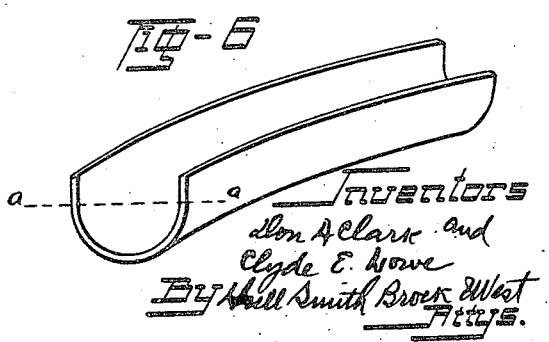

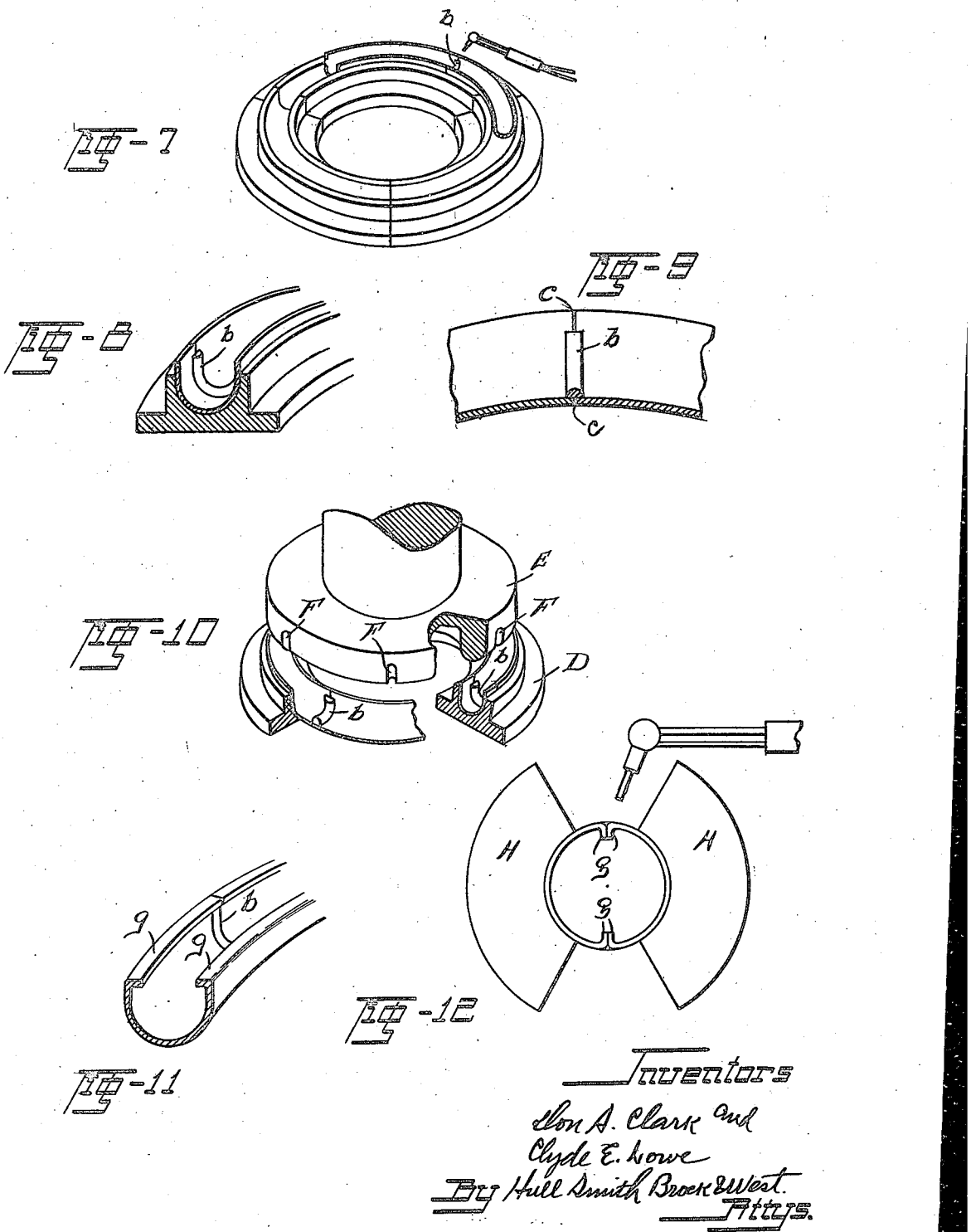

UNITED STATES PATENT OFFICE.

DON A. CLARK AND CLYDE E. LOWE, OF CLEVELAND, OHIO, ASSIGNORS, BY MESNE ASSIGNMENTS, TO THE REPUBLIC TOOL AND MANUFACTURING COMPANY, OF CLEVELAND, OHIO, A CORPORATION OF DELAWARE.

METHOD OF MAKING TIRE-MANDRELS.

1,380,528.      Specification of Letters Patent.      Patented June 7, 1921.

Application filed July 31, 1919. Serial No. 314,551.

*To all whom it may concern:*

Be it known that we, DON A. CLARK and CLYDE E. LOWE, citizens of the United States, residing at Cleveland, in the county of Cuyahoga and State of Ohio, have invented a certain new and useful Improvement in Methods of Making Tire-Mandrels, of which the following is a full, clear, and exact description, reference being had to the accompanying drawings.

This invention relates to mandrels for use in the production of pneumatic tires and parts thereof, under which term we include not only the specific mandrels used for the fashioning of inner tubes but also cores used in making casings and liners. The objects of the present invention are the provision of a new and improved process for the manufacture of these mandrels out of sheet metal; the provision of a new and improved process for securing and maintaining the requisite accuracy in the dimensions of devices of this character; the provision of a new and ingenious construction of mandrel; while further objects and advantages will become apparent as the description proceeds.

It has long been the established practice to fashion the various parts of pneumatic tires, whether casings or liners or inner tubes, upon mandrels or cores of the requisite shape. In order to obtain the necessary accuracy of shape and size as well as the smooth and finished surface requisite to successful operation, these devices were formerly made of cast iron and turned to size in a boring mill, which was not only a very expensive operation but resulted in a core of great weight and high heat capacity. In our prior applications Serial No. 242,019 filed June 26, 1918, and Serial No. 272,412, filed January 22, 1919, we described and claimed certain processes whereby cores of the requisite accuracy could be made from sheet metal. In those applications we described the making of mandrels or cores by first welding completely together the various channel pieces and afterward striking the completely welded device in finishing dies whereby the metal was in some cases stretched and in other cases compressed, thus overcoming the warping caused by heat. Ordinarily at that time our process had been to first weld opposite channel sections together longitudinally so as to form hollow curved bodies and then to butt-weld various bodies together to form either a continuous circle or one which was sufficiently continuous to constitute a mandrel. We have discovered that by first welding together the transverse margins of longitudinally abutting channel members endwise to form either a complete circle or one which is sufficient for the purpose, and then welding longitudinally the two halves, we produce a mandrel which warps and twists less than one which is made by performing the longitudinal welding prior to the transverse weld, and in many cases the final blow can be omitted at least under conditions where extreme accuracy is not required. Furthermore we have found that in the external welding of the butt welds there is invariably a shrinkage or contraction of the mandrels which is absolutely unescapable even by the most careful internal reinforcement; but by the variation of our process herein described we are able both to secure a stronger weld, to nullify this shrinkage, and to dispense with any separate internal reinforcement whatever.

In the drawings accompanying and forming a part of this application we have illustrated certain steps in our improved process together with certain examples of mandrels made therefrom, although it will be understood that these are only a few of the steps which may be employed and only a small number out of the numberless forms that the complete device may take. In these drawings, Figure 1 is a plan view and Fig. 2 a sectional view of the mandrel constructed in accordance with our invention and adapted particularly for the manufacture of tire casings; Figs. 3 and 4 are respectively a plan view and a sectional view of a mandrel constructed in accordance with our invention and adapted for the manufacture of inner tubes for pneumatic tires; Fig. 5 is a plan view of a blank used in making our improved mandrel; Fig. 6 illustrates a channel member drawn from said blank; Fig. 7 illustrates a step of butt-welding such channel members together; Fig. 8 is a detail perspective view and Fig. 9 a detail longitudinal section of a channel and joint made according to Fig. 7; Fig. 10 illustrates the reshaping step afterward performed; Fig. 11 illustrates the incurving of the margins; and Fig. 12 illustrates the step of joining together the two ring sections thus produced.

According to the preferred form of our invention we first take blanks of sheet metal of the shape shown in Fig. 5 and draw them between dies to an arcuate channel form shown in Fig. 6, the direction of curvature being in the plane of the open mouth of the channel, and the lips of the member projecting beyond the 180° limit as shown by the line $a$—$a$. These channel members are then cut to the requisite length and assembled together end to end in a form or die as shown in Fig. 7 whereby they are firmly held in a circular position, after which they are butt-welded together internally, sufficient weld-metal being added to the joints to build up a ridge or rib as shown at $b$ in Figs. 8 and 9. It is possible to chamfer or bevel the meeting ends of the sections, but we find no advantage in doing so, and in fact a disadvantage owing to the weakening of the lips which thereby become less resistant to external blows when the device is finished; and the building of a considerable body of applied metal is an advantage as affording an internal reinforcement at this point. The ridge formed in this way generally has a thickness of from $\frac{1}{8}$ to $\frac{3}{8}$ inch and a width of from about $\frac{1}{4}$ to about $\frac{1}{2}$ inch. However, it is best not to continue the full depth of this ridge clear to the longitudinal margins of the members but to terminate the same at about the 180° mark as shown in Figs. 8 and 9.

All the internal welds are preferably made at one time and without removing the device from the form. When they are finished, however, it is the usual practice to remove the same and fill the outer part of the crevices $c$—$c$ with a suitable material which shall prevent fingers of rubber from forming therein. This may be done either by autogenous welding or by the application of solder or like low melting alloys or other substances, or may be entirely omitted since this step is not an essential part of our invention.

The completely welding ring is then placed in one member D of a finishing die (which is of the same shape as the form shown in Fig. 7 and may indeed be performed in that identical device) and is struck by means of a punch E which conforms thereto and is provided at spaced points with notches F—F for the reception of the weld seams. It will be understood that this step may consist merely of a straightening operation or the dies may vary so much from the shape or size of the device already constructed as to constitute a real drawing step, except that the drawing ought to be rather small so as not to open up the joints but merely to overcome the weld strains and to obliterate the warping caused by the local heating.

Immediately after this step the marginal lips of the channels are turned inwardly as shown at $g$—$g$ after which two similar channel members are clamped together as shown in Fig. 12 and welded externally around their longitudinal seams. The sloping of the metal produced by this bending affords depth for the weld seam. During this operation the members are preferably held together in clamps H—H, of considerable longitudinal extent and of considerable massiveness and heat capacity, the better to avoid warping or twisting of the device, but experience proves that even in the absence of these the warping is much less than is produced by an exterior butt welding. We have found that with the intermediate removal of the transverse distortion caused by the butt welding, the final distortion remaining after these longitudinal seams are welded is much less objectionable than before, and owing to its uniform distribution throughout the entire circumference of the circle can be allowed for to a considerable extent in the sizing. It results from this that at the conclusion of welding the entire device is within the limits of tolerance for size and shape and in many or most instances a final pressing in the dies can be omitted.

In fact the internal welding of the butt joints is attended with so much less distortion than in the case of external welding at these points that we are able in some instances to dispense with the intermediate straightening step, in which case the lips $g$—$g$ can be formed even prior to the butt-welding. It will be understood that we do not limit ourselves to the use of two such lips, since the lip which lies at the inner side of the curve is of much less value than the lip which lies at the outer side and can be omitted with little loss.

It will be understood that many changes can be made within the scope of our invention. It will also be understood that the particular description heretofore presented is merely illustrative of the procedure which may be followed with a particular cross section, and that different cross sections will require slight modifications in treatment which will be apparent to those skilled in the art and that we do not limit ourselves in any way except as specifically recited in the annexed claims.

Having thus described my invention, what we claim is:

1. The process of making a pneumatic tire mandrel, which includes the steps of first forming a plurality of curvilinear sheet metal channel members, second arranging said members in circular form and butt welding them interiorly at their transverse margins, and afterward welding them together exteriorly at their longitudinal margins.

2. The process of making a pneumatic tire mandrel, which includes the steps of first forming a plurality of curvilinear sheet metal channel members, second arranging said members in circular form and butt welding them interiorly at their transverse margins, next reshaping the members in dies to remove the distortion, and finally welding them together exteriorly at their longitudinal margins.

3. The process of making a pneumatic tire mandrel, which includes the steps of, first, forming a plurality of transversely-semicircular, longitudinally arcuate sheet metal channel-members each having the plane of its open face perpendicular to its axis of curvature; second, assembling together lengthwise a plurality of similar channel members with their open faces turned in the same direction; third, butt-welding said members together interiorly so as to produce ring-formed members; and, finally, assembling similar ring-formed members together and welding them externally at their longitudinal margins.

4. The process of making a pneumatic tire mandrel, which includes the steps of, first, forming a plurality of transversely-semicircular, longitudinally arcuate sheet metal channel-members each having the plane of its open face perpendicular to its axis of curvature; second, assembling together lengthwise a plurality of similar channel members with their open faces turned in the same direction; third, butt-welding said members together interiorly so as to produce ring-formed members; fourth, reshaping said last named members to remove the distortion produced by the butt-welding; and, fifth, assembling complementary ring-formed members together and welding them externally at their longitudinal margins.

5. The process of making a pneumatic tire mandrel, which includes the steps of, first, forming a plurality of open sided channel members; second, assembling together a plurality of such members end to end with their open faces turned in the same direction and butt welding them together internally; third, sloping the outer edges of their longitudinal margins; and, fourth, assembling together a plurality of internally welded members and welding them together externally at such longitudinal margins.

6. The process of making a pneumatic tire mandrel, which includes the steps of forming a plurality of open sided channel members, butt-welding similar members together interiorly at their transverse margins, and seam-welding them together exteriorly at their longitudinal margins, the butt-welding step preceding the seam-welding step and the process also including at one point the step of bending inwardly the longitudinal margins of the channel members to produce stiffening flanges and to provide room for the weld seams.

7. The process of making a pneumatic tire mandrel, which includes the steps of first forming a plurality of open sided channel members; second, butt-welding similar members together interiorly at their transverse margins, and seam-welding them together exteriorly at their longitudinal margins to form annuli; third, reshaping said annuli after welding to remove the distortion produced thereby; fourth, bending inwardly the longitudinal margins of the annuli to produce stiffening flanges and provide a uniform sloping edge; and, finally, assembling two complementary members together and welding them externally at such last mentioned edges.

8. In the process of forming a tire mandrel from channel-shaped members of sheet metal wherein said members are welded together both longitudinally and transversely, the step which consists of welding longitudinally-adjacent members together prior to welding oppositely-adjacent members together.

9. In the process of forming a tire mandrel from channel-shaped members of sheet metal, the steps of butt-welding longitudinally-adjacent members together interiorly, and subsequently seam-welding oppositely-adjacent members together exteriorly.

10. In the process of forming a tire mandrel from channel-shaped members of sheet metal, the steps of butt-welding longitudinally-adjacent members together interiorly, reshaping the members to remove distortion, and seam-welding oppositely-adjacent members together exteriorly, such steps occurring in the order named.

11. In the process of forming a tire mandrel from channel-shaped members of sheet metal, the steps which consist of welding such members together both longitudinally and transversely and filling with externally applied metal the cracks between the ends of adjacent members, the transverse welding step being completed previously to beginning the longitudinal welding step, and the filling step being subsequent to the transverse welding step.

12. The process of making a pneumatic tire mandrel which includes the steps of, first, forming a plurality of open sided channel members, second, assembling together in a die a plurality of such members end to end with their open faces upward; third, applying molten metal to the abutting ends thereof so as to weld such ends together and to form upon the interior of the device an internal reinforcement displaced above the surface thereof and terminating near the transverse margins of the members, fourth, reshaping the members after such welding by the insertion of a punch which conforms to said die and is formed with transverse grooves registering with such reinforcements and, fifth, bending inwardly such transverse margins.

In testimony whereof we hereunto affix our signatures.

DON A. CLARK.
CLYDE E. LOWE.